United States Patent
Hirschmann et al.

(10) Patent No.: US 10,171,127 B2
(45) Date of Patent: Jan. 1, 2019

(54) METHOD, SYSTEM AND COMPUTER PROGRAM FOR SYNCHRONIZING PSEUDORANDOM BINARY SEQUENCE MODULES

(71) Applicant: Rohde & Schwarz GmbH & Co. KG, Munich (DE)

(72) Inventors: Susanne Hirschmann, Dachau (DE); Franz-Josef Zimmermann, Markt Schwaben (DE)

(73) Assignee: Rohde & Schwarz GmbH & Co. KG, Munich (DE)

( * ) Notice: Subject to any disclaimer, the term of this patent is extended or adjusted under 35 U.S.C. 154(b) by 0 days.

(21) Appl. No.: 15/600,552

(22) Filed: May 19, 2017

(65) Prior Publication Data
US 2018/0337707 A1    Nov. 22, 2018

(51) Int. Cl.
| | |
|---|---|
| *H04B 1/7075* | (2011.01) |
| *G06F 7/58* | (2006.01) |
| *H04L 9/06* | (2006.01) |
| *G06F 11/07* | (2006.01) |
| *H04J 13/10* | (2011.01) |

(52) U.S. Cl.
CPC ........... *H04B 1/7075* (2013.01); *G06F 7/586* (2013.01); *G06F 11/0763* (2013.01); *H04L 9/06* (2013.01); *H04B 2201/707* (2013.01); *H04J 13/10* (2013.01)

(58) Field of Classification Search
CPC ............ H04B 1/7075; H04B 2201/707; G06F 7/5886; H04L 9/06; H04J 13/10
See application file for complete search history.

(56) References Cited

U.S. PATENT DOCUMENTS

| | | |
|---|---|---|
| 4,341,925 A | 7/1982 | Frosch |
| 5,007,088 A | 4/1991 | Ooi et al. |
| 5,060,266 A | 10/1991 | Dent |
| 5,761,216 A | 6/1998 | Sotome et al. |

(Continued)

FOREIGN PATENT DOCUMENTS

| | | |
|---|---|---|
| CA | 2310887 A1 | 12/2001 |
| CN | 101132245 | 2/2008 |

(Continued)

OTHER PUBLICATIONS

Akhshani, et al., "Pseudo Random Number Generator Based on Synchronized Chaotic Maps", International Journal of Modern Physics C, vol. 21, No. 2 (2010) 275-290, Jan. 2010.

(Continued)

*Primary Examiner* — Janice N Tieu
(74) *Attorney, Agent, or Firm* — Potomac Technology Law, LLC

(57) ABSTRACT

A system comprises a receiver comprising a first pseudorandom binary sequence module, and a transmitter comprising a second pseudorandom binary sequence module. The first pseudorandom binary sequence module is initialized with a first received bit sequence to start bit sequence generation with the aid of the second pseudorandom binary sequence module. Further, received remaining bits are compared to bit sequences generated with the aid of the first pseudorandom binary sequence module to determine whether a bit error rate is below a predefined threshold.

15 Claims, 4 Drawing Sheets

```
┌─────────────────────────────────────────┐
│ Initialize a first pseudorandom binary  │
│ sequence module of a receiver with a    │
│ first received bit sequence to start bit│
│ sequence generation with the aid of a   │
│ second pseudorandom binary sequence     │─── S60
│ module of a transmitter                 │
└─────────────────────────────────────────┘
                    │
                    ▼
┌─────────────────────────────────────────┐
│ Compare received remaining bits to bit  │─── S61
│ sequences generated with the aid of the │
│ first pseudorandom binary sequence      │
│ module to determine whether a bit error │
│ rate is below a predefined threshold    │
└─────────────────────────────────────────┘
```

(56) References Cited

U.S. PATENT DOCUMENTS

| | | |
|---|---|---|
| 6,215,876 B1 | 4/2001 | Gilley |
| 7,743,288 B1 | 6/2010 | Wang |
| 8,406,285 B1 | 3/2013 | Diukman |
| 2001/0008001 A1 | 7/2001 | Suemura |
| 2003/0063566 A1* | 4/2003 | Abramovitch ......... H04L 1/242 370/241 |
| 2003/0112971 A1 | 6/2003 | Ye et al. |
| 2003/0147457 A1 | 8/2003 | King et al. |
| 2004/0168111 A1 | 8/2004 | Arnold et al. |
| 2004/0181714 A1* | 9/2004 | Jungerman ............. H04L 1/20 714/704 |
| 2006/0209934 A1 | 9/2006 | Zhengdi et al. |
| 2007/0185668 A1 | 8/2007 | Moll |
| 2009/0225741 A1 | 9/2009 | Wang et al. |
| 2010/0027486 A1 | 2/2010 | Gorokhov et al. |
| 2010/0095166 A1 | 4/2010 | Krepner et al. |
| 2011/0164751 A1 | 7/2011 | Natarajan |
| 2012/0008709 A1 | 1/2012 | Wang et al. |
| 2012/0011290 A1 | 1/2012 | Warner et al. |
| 2012/0308230 A1 | 12/2012 | Lee et al. |
| 2014/0056589 A1 | 2/2014 | Yeh et al. |
| 2018/0076925 A1 | 3/2018 | Neal |
| 2018/0091335 A1 | 3/2018 | Schnizler |

FOREIGN PATENT DOCUMENTS

| | | |
|---|---|---|
| CN | 102664676 | 9/2012 |
| CN | 105391603 | 3/2016 |
| CN | 105610607 | 5/2016 |
| FI | 20126147 | 5/2013 |
| JP | 08056242 | 2/1996 |
| KR | 20010044938 | 6/2001 |
| WO | WO0180238 A1 | 10/2001 |
| WO | WO0195561 A2 | 12/2001 |
| WO | WO200497576 A2 | 11/2004 |
| WO | WO2005015248 A1 | 2/2005 |
| WO | WO2012149400 A2 | 11/2012 |

OTHER PUBLICATIONS

Choi, et al., "Jitter Characterization of Pseudo-Random Bit Sequences Using Incoherent Sub-Sampling", 2010 19th IEEE Asian Test Symposium, DOI 10.1109/ATS.2010.11, Nov. 2010.

Dogaru, "Hybrid Cellular Automata as Pseudo-Random Number Generators with Binary Synchronization Property", IEEE, 9781-4244-3786-3/09, Mar. 2009.

Kim, et al., "45-Gb/s SiGe BiCMOS PRBS Generator and PRBS Checker", IEEE 2003 Custom Integrated Circuits Conference, 0-7803-7842-3/03, Mar. 2003.

Liang, et al., "An efficient parallel pseudorandom bit generator based on an asymmetric coupled chaotic map lattice", Pramana—J. Phys., vol. 85, No. 4, Oct. 2015, Oct. 2015.

Moon, et al., "Low-Cost High-Speed Pseudo-Random Bit Sequence Characterization Using Nonuniform Periodic Sampling in the Presence of Noise", IEEE 30th VLSI Test Symposium (VTS), 978-1-4673-1074-1/12, Jan. 2012.

Ripp, "Integrated BER analysis in DVB transmission systems", Fachhochschule Darmstadt—University of Applied Sciences, Thesis Harald Ripp, Jul. 29, 1999.

* cited by examiner

METHOD, SYSTEM AND COMPUTER PROGRAM FOR SYNCHRONIZING PSEUDORANDOM BINARY SEQUENCE MODULES

TECHNICAL FIELD

The invention relates to method, system and computer program for synchronizing pseudorandom binary sequence modules, such as a first pseudorandom binary sequence module of a receiver and a second pseudorandom binary sequence module of a transmitter.

BACKGROUND

Generally, in times of an increasing number of communication applications, there is a growing need of highly accurate bit error rate measurements with special respect to high order pseudorandom binary sequences. In this context, the challenge is to synchronize at least two separate pseudorandom binary sequence modules of a receiver and a transmitter prior to measure a bit error rate in a most efficient and most cost-effective manner.

U.S. Pat. No. 5,761,216 relates to a bit error measurement system for testing a bit error rate with the aid of a binary sequence. Disadvantageously, this document discloses a kind of brute-force approach of checking on all positions of the binary sequence, which leads to a very high computational load making the whole measurement, and thus also synchronization, inefficient and cost-intensive.

Accordingly, there is a need for an approach for synchronizing binary sequence modules, such as pseudorandom binary sequence modules, in order to make bit error rate measurements most efficient and cost-effective.

Some Example Embodiments

Embodiments of the present invention advantageously address the foregoing requirements and needs, as well as others, by providing a method, system and computer program for synchronizing binary sequence modules, such as pseudorandom binary sequence modules, in order to make bit error rate measurements most efficient and cost-effective.

According to a first aspect of the invention, a method for synchronizing a first pseudorandom binary sequence module of a receiver and a second pseudorandom binary sequence module of a transmitter is provided. The method comprises the steps of initializing the first pseudorandom binary sequence module with a first received bit sequence to start bit sequence generation with the aid of the second pseudorandom binary sequence module, and comparing received remaining bits to bit sequences generated with the aid of the first pseudorandom binary sequence module to determine whether a bit error rate is below a predefined threshold. By way of example, if the bit error rate (BER) is below the predefined threshold (e.g., below 10% or below 5%), then the first pseudorandom binary sequence module of the receiver and the second pseudorandom binary sequence module of the transmitter will be synchronized, and the remaining errors will be bit rate errors and not synchronization failures.

According to an example implementation form of the first aspect, the method further comprises the step of synchronizing the first pseudorandom binary sequence module and the second pseudorandom binary sequence module, if the bit error rate is below the predefined threshold. By way of example, as mentioned above, if the bit error rate (BER) is below the predefined threshold (e.g., below 10% or below 5%), then the first pseudorandom binary sequence module of the receiver and the second pseudorandom binary sequence module of the transmitter will be synchronized, and the remaining errors will be bit rate errors and not synchronization failures.

According to a further example implementation form of the first aspect, the method further comprises the step of starting measurements with respect to the bit error rate.

According to a further example implementation form of the first aspect, the method further comprises the step of accounting for phase ambiguities in order to check each candidate of an initial phase for whether the bit error rate of the respective candidate is below the predefined threshold.

According to a further example implementation form of the first aspect, the method further comprises the step of initializing again with a next set of received bits, if the bit error rate is above the predefined threshold. Advantageously, in this manner, initialization will be successfully achieved.

According to a further example implementation form of the first aspect, the first pseudorandom binary sequence module sequentially flips each of a first set of bits in order to have a proper initialization set, if the bit error rate is above the predefined threshold. Advantageously, this allows corrections if the first set of bits (e.g., the set comprising 23 bits) itself had a bit error rate.

According to a further example implementation form of the first aspect, at least one of the first pseudorandom binary sequence module or the second pseudorandom binary sequence module runs backwards to make a check on previous bits to check a bit error rate threshold. Advantageously, this allows consideration of all bits received in the BER threshold calculation even if further bit sets are used to initialize.

According to a second aspect of the invention, a system is provided. The system comprises a receiver comprising a first pseudorandom binary sequence module, and a transmitter comprising a second pseudorandom binary sequence module. In this context, the first pseudorandom binary sequence module is initialized with a first received bit sequence to start bit sequence generation with the aid of the second pseudorandom binary sequence module. Further, received remaining bits are compared to bit sequences generated with the aid of the first pseudorandom binary sequence module to determine whether a bit error rate is below a predefined threshold. By way of example, if the bit error rate (BER) is below the predefined threshold (e.g., below 10% or below 5%), then the first pseudorandom binary sequence module of the receiver and the second pseudorandom binary sequence module of the transmitter will be synchronized, and the remaining errors will be bit rate errors and not synchronization failures.

According to an example implementation form of the second aspect, the system is configured in that the first pseudorandom binary sequence module and the second pseudorandom binary sequence module are synchronized, if the bit error rate is below the predefined threshold. By way of example, as mentioned above, if the bit error rate (BER) is below the predefined threshold (e.g., below 10% or below 5%), then the first pseudorandom binary sequence module of the receiver and the second pseudorandom binary sequence module of the transmitter will be synchronized, and the remaining errors will be bit rate errors and not synchronization failures.

According to a further example implementation form of the second aspect, the system is configured in that measurements with respect to the bit error rate are started.

According to a further example implementation form of the second aspect, the system accounts for phase ambiguities in order to check each candidate of an initial phase for whether the bit error rate of the respective candidate is below the predefined threshold.

According to a further example implementation form of the second aspect, the system is configured in that the first pseudorandom binary sequence module is initialized again with a next set of received bits, if the bit error rate is above the predefined threshold. Advantageously, in this manner, initialization will be successfully achieved.

According to a further example implementation form of the second aspect, the first pseudorandom binary sequence module sequentially flips each of a first set of bits in order to have a proper initialization set, if the bit error rate is above the predefined threshold. Advantageously, this allows corrections if the first set of bits (e.g., the set comprising 23 bits) itself had a bit error rate.

According to a further example implementation form of the second aspect, at least one of the first pseudorandom binary sequence module or the second pseudorandom binary sequence module runs backwards to make a check on previous bits to check a bit error rate threshold. Advantageously, this allows consideration of all bits received in the BER threshold calculation even if further bit sets are used to initialize.

According to a third aspect of the invention, a computer program with program code means is provided for performing the following steps on a computer device or a digital signal processor: initializing the first pseudorandom binary sequence module with a first received bit sequence to start bit sequence generation with the aid of the second pseudorandom binary sequence module, and comparing received remaining bits to bit sequences generated with the aid of the first pseudorandom binary sequence module to determine whether a bit error rate is below a predefined threshold. By way of example, if the bit error rate (BER) is below the predefined threshold (e.g., below 10% or below 5%), then the first pseudorandom binary sequence module of the receiver and the second pseudorandom binary sequence module of the transmitter will be synchronized, and the remaining errors will be bit rate errors and not synchronization failures.

According to an example implementation form of the third aspect, the computer program with program code means is provided for further performing the following step on a computer device or a digital signal processor: synchronizing the first pseudorandom binary sequence module and the second pseudorandom binary sequence module, if the bit error rate is below the predefined threshold. By way of example, as mentioned above, if the bit error rate (BER) is below the predefined threshold (e.g., below 10% or below 5%), then the first pseudorandom binary sequence module of the receiver and the second pseudorandom binary sequence module of the transmitter will be synchronized, and the remaining errors will be bit rate errors and not synchronization failures.

According to a further example implementation form of the third aspect, the computer program with program code means is provided for further performing the following step on a computer device or a digital signal processor: starting measurements with respect to the bit error rate.

According to a further example implementation form of the third aspect, the computer program with program code means is provided for further performing the following step on a computer device or a digital signal processor: accounting for phase ambiguities in order to check each candidate of an initial phase for whether the bit error rate of the respective candidate is below the predefined threshold.

Still other aspects, features, and advantages of the present invention are readily apparent from the following detailed description, simply by illustrating a number of particular embodiments and implementations, including the best mode contemplated for carrying out the present invention. The present invention is also capable of other and different embodiments, and its several details can be modified in various obvious respects, all without departing from the spirit and scope of the present invention. Accordingly, the drawings and description are to be regarded as illustrative in nature, and not as restrictive.

BRIEF DESCRIPTION OF THE DRAWINGS

Embodiments of the present invention are illustrated by way of example, and not by way of limitation, in the figures of the accompanying drawings, in which like reference numerals refer to similar elements, and in which.

DETAILED DESCRIPTION

A method, system and computer program for synchronizing binary sequence modules, such as pseudorandom binary sequence modules, in order to make bit error rate measurements most efficient and cost-effective, are described. In the following description, for the purposes of explanation, numerous specific details are set forth in order to provide a thorough understanding of the invention. It is apparent, however, that the invention may be practiced without these specific details or with an equivalent arrangement. In other instances, well-known structures and devices are shown in block diagram form in order to avoid unnecessarily obscuring the invention.

Figure 1:
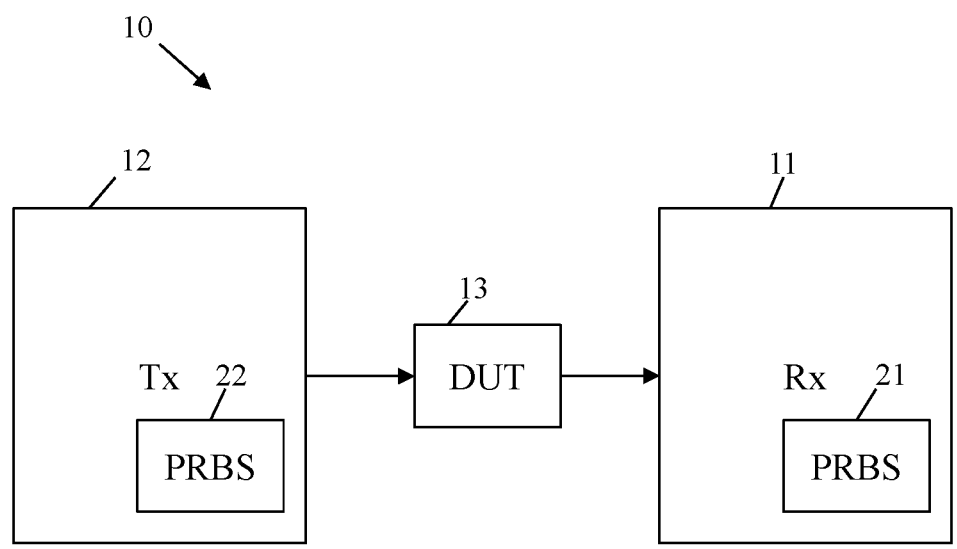
FIG. 1 shows a block diagram of a system for synchronizing binary sequence modules, in accordance with example embodiments of the present invention.

FIG. 1 shows a block diagram of a system for synchronizing binary sequence modules, in accordance with example embodiments of the present invention.

According to FIG. 1, the system 10 comprises a transmitter 12, a device under test (DUT) 13, and a receiver 11. Further, whereas the receiver 11 comprises a first pseudorandom binary sequence (PRBS) module 21, the transmitter 12 comprises a second PRBS module 22. In addition to this, an output of the transmitter 12 is connected to an input of the DUT 13, and an output of the DUT 13 is connected to an input of the receiver 11. In other words, a signal generated by the transmitter 12 with the aid of the second PRBS module 22 is passed through the DUT 13 to the receiver 11.

Moreover, the received signal or the received bits, respectively, are compared to bit sequences generated with the aid of the first PRBS module 21 of the receiver 11 in order to determine whether a bit error rate is below a predefined threshold. Afterwards, if the bit error rate is below the predefined threshold, exemplarily below 10%, preferably below 5%, most preferably below 1%, the first PRBS module 21 of the receiver 11 and the second PRBS module 22 of the transmitter 12 are synchronized. In this case, measurements with respect to the bit error rate can be started. Otherwise, if the bit error rate is above the predefined threshold, synchronization is initialized again with a next set of received bits.

Additionally or alternatively, if the bit error rate is above the predefined threshold, the first PRBS module 21 of the receiver 11 sequentially flips each of a first set of bits in order to have a proper initialization set.

In addition to this, the system 10 accounts for phase ambiguities in order to check each candidate of an initial phase for whether the bit error rate of the respective candidate is below the predefined threshold.

In this context, the candidate can be seen as a kind of phase position. For instance, with respect to quadrature phase-shift keying (QPSK) or 16-quadrature amplitude modulation (16-QAM), 4 candidates, especially 4 candidates of the initial phase, exist, whereas with respect to 8-phase-shift keying (8-PSK), 8 candidates, especially 8 candidates of the initial phase, exist.

Further, at least one of the first PRBS module 21 of the receiver 11 or the second PRBS module 22 of the transmitter 12 runs backwards to make a check on previous bits to check a bit error rate threshold.

Figure 2:
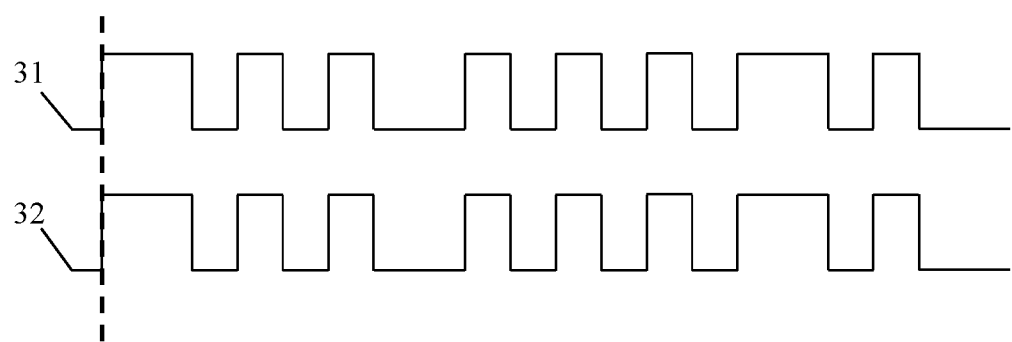
FIG. 2 shows two example pseudorandom binary sequences that are synchronized.

With reference to FIG. 2, two example pseudorandom binary sequences 31 and 32 are shown, wherein the sequences 31 and 32 are synchronized.

Whereas the first pseudorandom binary sequence 31 may especially be generated by the first PRBS module 21 of the receiver 11, the second pseudorandom binary sequence 32 may especially be generated by the second PRBS module 22 of the transmitter 12.

Even though the first sequence 31 and the second sequence 32 are already synchronized, at least one of the first PRBS module 21 or the second PRBS module 22 may run backwards in order to make a check on previous or subsequent bits to check the respective bit error rate threshold.

Figure 3:
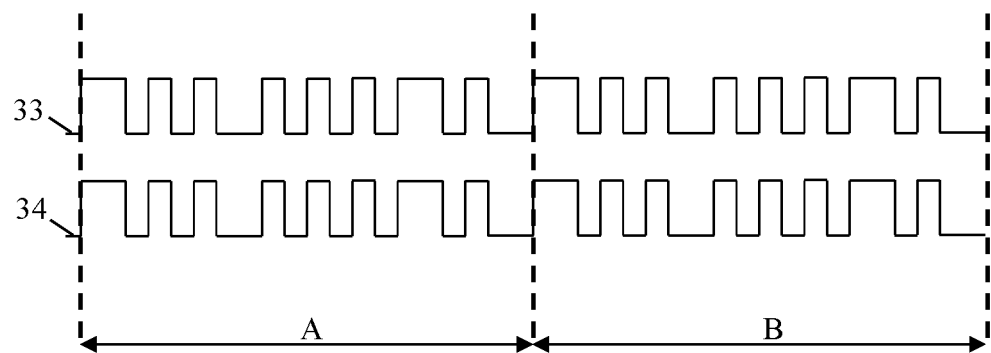
FIG. 3 shows two example pseudorandom binary sequences that are synchronized, and each of which is continued.

With reference to FIG. 3, two example pseudorandom binary sequences 33 and 34 are shown, wherein the sequences 33 and 34 are not only synchronized but also, especially periodically, continued, which is illustrated with the aid of two sections A and B. For instance, each of the sections A and B of each of the sequences 33 and 34 may comprise 20 to 26 bits, preferably 23 bits.

By analogy with FIG. 2, whereas the first pseudorandom binary sequence 33 may especially be generated by the first PRBS module 21 of the receiver 11, the second pseudorandom binary sequence 34 may especially be generated by the second PRBS module 22 of the transmitter 12.

Likewise analogously to FIG. 2, even though the first sequence 33 and the second sequence 34 are already synchronized, at least one of the first PRBS module 21 or the second PRBS module 22 may run backwards in order to make a check on previous or subsequent bits to check the respective bit error rate threshold.

Figure 4:
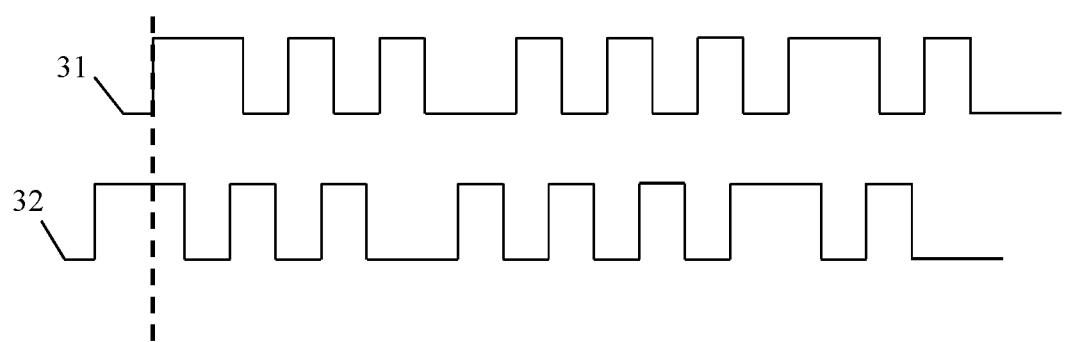
FIG. 4 shows two example pseudorandom binary sequences that are not synchronized.

FIG. 4 illustrates two example pseudorandom binary sequences 31 and 32, wherein the sequences 31 and 32 are not synchronized.

By analogy with FIG. 2 and FIG. 3, whereas the first pseudorandom binary sequence 31 may especially be generated by the first PRBS module 21 of the receiver 11, the second pseudorandom binary sequence 32 may especially be generated by the second PRBS module 22 of the transmitter 12.

Further, as already mentioned above, at least one of the first PRBS module 21 or the second PRBS module 22 may run backwards in order to make a check on previous or subsequent bits to check the respective bit error rate threshold.

Additionally or alternatively, in this case of non-synchronized sequences 31 and 32, it may be switched or moved along the first sequence 31 or the second sequence 32 or both in order to achieve a respective synchronization.

In this context, the first PRBS module 21 of the receiver 11 or the second PRBS module 22 of the transmitter 12, preferably the first PRBS module 21, may sequentially flip each of a first set of received or transmitted bits, preferably received bits, in order to have a proper initialization set. In other words, if the bit error rate is above the predefined threshold, the next set of bits is used, wherein a set of bits especially comprises 20 to 26 bits, preferably 23 bits.

Figure 5:
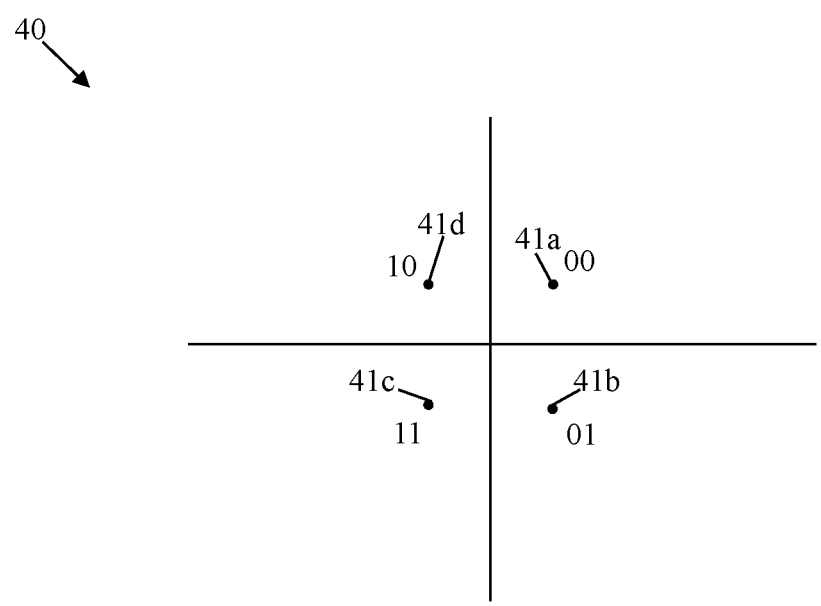
FIG. 5 shows four example symbols in an example constellation diagram.

FIG. 5 shows a constellation diagram 40 with respect to an in-phase (I) and a quadrature-phase (Q) component, which is also called I-Q-diagram.

In this case, an exemplary QPSK is illustrated, wherein the constellation diagram 40 comprises four constellation points 41a, 41b, 41c, 41d, each of which corresponds to its respective symbol out of the set of symbols comprising '00', '01', '11', and '10'.

For instance, if the constellation diagram 40 results from the system 10 according to FIG. 1, due to four different phase positions, the system 10 may account for phase ambiguities in order to check each candidate out of four candidates of an initial phase for whether the bit error rate of the respective candidate is below the predefined threshold.

In addition to this, in the context of phase ambiguities, clocks of the first and the second PRBS module 21 and 22 have to be synchronized to one another that the respective edges of the first sequence 31 or 33 are synchronized to the corresponding edges of the second sequence 32 or 34.

Additionally or alternatively, if there is no phase information available, the system 10 may test each possibility out of the respective number of possible phase positions.

Figure 6:
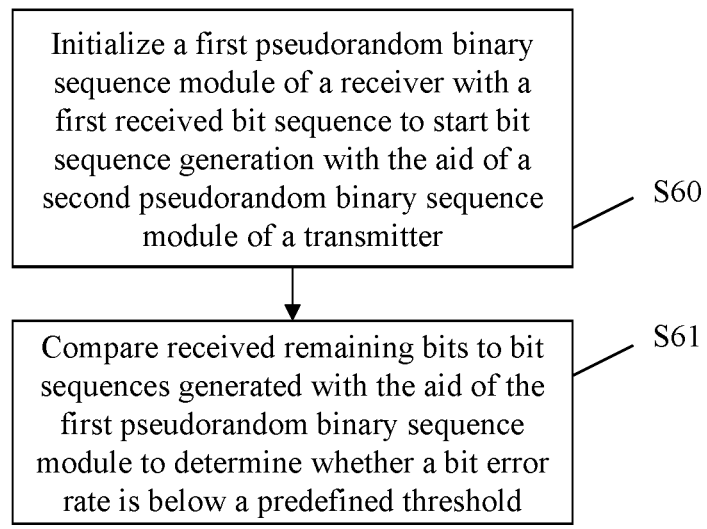
FIG. 6 shows a flow chart of a method for synchronizing binary sequence modules, in accordance with example embodiments of the present invention.

FIG. 6 shows a flow chart of a method for synchronizing binary sequence modules, in accordance with example embodiments of the present invention. In a first step S60, a first pseudorandom binary sequence module of a receiver is initialized with a first received bit sequence to start bit sequence generation with the aid of a second pseudorandom binary sequence module of a transmitter. Then, in a second step S61, received remaining bits are compared to bit sequences generated with the of the first pseudorandom binary sequence module to determine whether a bit error rate is below a predefined threshold.

While various embodiments of the present invention have been described above, it should be understood that they have been presented by way of example only, and not limitation. Numerous changes to the disclosed embodiments can be made in accordance with the disclosure herein without departing from the spirit or scope of the invention. Thus, the breadth and scope of the present invention should not be limited by any of the above described embodiments. Rather, the scope of the invention should be defined in accordance with the following claims and their equivalents.

Although the invention has been illustrated and described with respect to one or more implementations, equivalent alterations and modifications will occur to others skilled in the art upon the reading and understanding of this specification and the annexed drawings. In addition, while a particular feature of the invention may have been disclosed with respect to only one of several implementations, such feature may be combined with one or more other features of the other implementations as may be desired and advantageous for any given or particular application.

What is claimed is:

1. A method for synchronizing a first pseudorandom binary sequence module of a receiver and a second pseudorandom binary sequence module of a transmitter, the method comprising:
   initializing the first pseudorandom binary sequence module with a first received bit sequence and performing bit sequence generation with the aid of the second pseudorandom binary sequence module;
   comparing received remaining bits to bit sequences generated with the aid of the first pseudorandom binary sequence module to determine whether a bit error rate is below a predefined threshold;
   accounting for phase ambiguities to check whether the bit error rate of each of a number of candidate phase positions for an initial phase is below the predefined threshold; and
   in a case where there is no phase information available, testing each of a plurality of possible phase positions for the respective number of candidate phase positions.

2. The method according to claim 1, further comprising:
   synchronizing the first pseudorandom binary sequence module and the second pseudorandom binary sequence module, when the bit error rate is below the predefined threshold.

3. The method according to claim 1, further comprising:
   starting measurements with respect to the bit error rate.

4. The method according to claim 1, further comprising:
   initializing with a next set of received bits, when the bit error rate is above the predefined threshold.

5. The method according to claim 1, wherein the first pseudorandom binary sequence module sequentially flips each of a first set of bits in order to have a proper initialization set, when the bit error rate is above the predefined threshold.

6. The method according to claim 1, wherein at least one of the first pseudorandom binary sequence module or the second pseudorandom binary sequence module runs backwards to make a check on previous bits to check a bit error rate threshold.

7. A system comprising:
   a receiver comprising a first pseudorandom binary sequence module; and
   a transmitter comprising a second pseudorandom binary sequence module; and
   wherein the first pseudorandom binary sequence module is configured to be initialized with a first received bit sequence and to perform bit sequence generation with the aid of the second pseudorandom binary sequence module,
   wherein the system is configured to compare received remaining bits to bit sequences generated with the aid of the first pseudorandom binary sequence module to determine whether a bit error rate is below a predefined threshold,
   wherein the system is further configured to account for phase ambiguities to check whether the bit error rate of each of a number of candidate phase positions for an initial phase is below the predefined threshold; and
   in a case where there is no phase information available, the system is further configured to test each of a plurality of possible phase positions for the respective number of candidate phase positions.

8. The system according to claim 7, wherein the first pseudorandom binary sequence module and the second pseudorandom binary sequence module are synchronized, when the bit error rate is below the predefined threshold.

9. The system according to claim 7, wherein measurements with respect to the bit error rate are started.

10. The system according to claim 7, wherein the first pseudorandom binary sequence module is configured further to be initialized with a next set of received bits, when the bit error rate is above the predefined threshold.

11. The system according to claim 7, wherein the first pseudorandom binary sequence module is further configured to sequentially flip each of a first set of bits in order to have a proper initialization set, when the bit error rate is above the predefined threshold.

12. The system according to claim 7, wherein at least one of the first pseudorandom binary sequence module and the second pseudorandom binary sequence module is configured to run backwards to make a check on previous bits to check a bit error rate threshold.

13. A non-transitory computer-readable storage medium including one or more sequences of program code, where, when the program code is executed on one or more processors of a device, the device is caused to perform synchronization of a first pseudorandom binary sequence module of a receiver and a second pseudorandom binary sequence module of a transmitter via at least the following steps:
   initializing the first pseudorandom binary sequence module with a first received bit sequence and performing bit sequence generation with the aid of the second pseudorandom binary sequence module;
   comparing received remaining bits to bit sequences generated with the aid of the first pseudorandom binary sequence module to determine whether a bit error rate is below a predefined threshold;
   accounting for phase ambiguities to check whether the bit error rate of each of a number of candidate phase positions for an initial phase is below the predefined threshold; and
   in a case where there is no phase information available, testing each of a plurality of possible phase positions for the respective number of candidate phase positions.

14. The non-transitory computer-readable storage medium of claim 13, wherein the synchronization of the first pseudorandom binary sequence module and the second pseudorandom binary sequence module further comprises:
   synchronizing the first pseudorandom binary sequence module and the second pseudorandom binary sequence module, when the bit error rate is below the predefined threshold.

15. The non-transitory computer-readable storage medium of claim 13, wherein the synchronization of the first pseudorandom binary sequence module and the second pseudorandom binary sequence module further comprises:
   starting measurements with respect to the bit error rate.

* * * * *